US009741193B2

(12) United States Patent
Chen et al.

(10) Patent No.: US 9,741,193 B2
(45) Date of Patent: Aug. 22, 2017

(54) PAPER CURRENCY NUMBER RECOGNITION APPARATUS AND RECOGNITION METHOD

(71) Applicant: GRG Banking Equipment Co., Ltd., Guangzhou, Guangdong (CN)

(72) Inventors: Zhuwen Chen, Guangzhou (CN); Mengtao Liu, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 192 days.

(21) Appl. No.: 14/426,972

(22) PCT Filed: Jul. 5, 2013

(86) PCT No.: PCT/CN2013/078911

§ 371 (c)(1),
(2) Date: Mar. 9, 2015

(87) PCT Pub. No.: WO2014/075452

PCT Pub. Date: May 22, 2014

(65) Prior Publication Data

US 2015/0279141 A1 Oct. 1, 2015

(30) Foreign Application Priority Data

Nov. 15, 2012 (CN) .......................... 2012 1 0462080

(51) Int. Cl.
*G06K 9/00* (2006.01)
*G07D 7/12* (2016.01)
(Continued)

(52) U.S. Cl.
CPC ............. *G07D 7/12* (2013.01); *G07D 7/0033* (2013.01); *G07D 7/121* (2013.01)

(58) Field of Classification Search
None
See application file for complete search history.

(56) References Cited

U.S. PATENT DOCUMENTS 3,851,971 A 12/1974 Koch
6,050,387 A 4/2000 Iwaki
(Continued)

FOREIGN PATENT DOCUMENTS

CN 101647046 A 2/2010
CN 102005078 A 4/2011
(Continued)

OTHER PUBLICATIONS

Extended European Search Report, dated Oct. 12, 2015, from corresponding European Application No. 13854512.4.
(Continued)

*Primary Examiner* — Weiwen Yang
(74) *Attorney, Agent, or Firm* — Wolf, Greenfield & Sacks, P.C.

(57) ABSTRACT

A paper currency number recognition apparatus and method. The apparatus comprises: a contact-type sensor (10) for acquiring paper currency image data; a white-light LED transmission light source board (20); an image acquisition processing board (40) which is integrated with an FPGA and a DSP, the FPGA being used for controlling ON/OFF of the white-light LED transmission light source board (20) and driving the contact-type sensor (10) to acquire an image, and the DSP being used for processing and recognizing the paper currency image data; and two pairs of position sensors (30) for detecting whether there is a paper currency entering the paper currency number recognition apparatus, wherein the white-light LED transmission light source board (20) has two light source modes which are strong and weak, and the two light source modes alternately provide a transmission light source for the contact-type sensor (10) to acquire the paper currency image data. The apparatus can acquire two white-light transmission images with different brightness of one and the same paper currency each time; therefore, the
(Continued)

numbers of both new and old paper currencies can be effectively recognized, and the accuracy rate of paper currency number recognition is improved.

7 Claims, 2 Drawing Sheets

(51) Int. Cl.
*G07D 7/00* (2016.01)
*G07D 7/121* (2016.01)

(56) References Cited

U.S. PATENT DOCUMENTS

| | | | | |
|---|---|---|---|---|
| 6,078,683 | A | 6/2000 | Denison et al. | |
| 6,278,795 | B1 * | 8/2001 | Anderson | G07D 7/00 194/206 |
| 8,162,125 | B1 * | 4/2012 | Csulits | G07D 7/0033 194/206 |
| 8,401,268 | B1 * | 3/2013 | Yacoubian | G07D 11/0084 235/379 |
| 2009/0324053 | A1 | 12/2009 | Ross et al. | |
| 2010/0007632 | A1 * | 1/2010 | Yamazaki | H01L 27/3234 345/175 |
| 2013/0242283 | A1 * | 9/2013 | Bailey | G01S 17/89 356/4.01 |

FOREIGN PATENT DOCUMENTS

| | | | |
|---|---|---|---|
| CN | 102169608 | A | 8/2011 |
| CN | 102324133 | A | 1/2012 |
| CN | 202306684 | U | 7/2012 |
| CN | 102930636 | A | 2/2013 |
| EP | 1049055 | A2 | 11/2000 |
| GB | 2227093 | A | 7/1990 |
| JP | H 3-191495 | A | 8/1991 |
| JP | 2010050551 | A | 3/2010 |
| KR | 20100011743 | A | 2/2010 |
| KR | 101014974 | B | 2/2011 |
| WO | WO 2011/047235 | A1 | 4/2011 |

OTHER PUBLICATIONS

International Search Report dated Oct. 10, 2013 from corresponding International Application No. PCT/CN2013/078911.

Kang, N., et al., A Platform for Bank Note Image Identification Based on FPGA and DSP, ICSP2012 Proceedings, China Academic Journal Electronic Publishing House, pp. 2318-2322.

* cited by examiner

PAPER CURRENCY NUMBER RECOGNITION APPARATUS AND RECOGNITION METHOD

CROSS REFERENCE TO RELATED APPLICATION

This application is the US national phase of International Application No. PCT/CN2013/078911 filed on Jul. 5, 2013, which claims the priority of Chinese patent application No. 201210462080.3 titled "PAPER CURRENCY NUMBER RECOGNITION APPARATUS AND RECOGNITION METHOD" and filed with the State Intellectual Property Office on Nov. 15, 2012, which applications are hereby incorporated by reference to the maximum extent allowable by law.

TECHNICAL FIELD

The present disclosure relates to the field of financial self-service equipment, in particular to a paper currency number recognition device and a recognition method.

BACKGROUND

Presently, the well-known paper currency number recognition device acquires an image by means of a contact image sensor CIS or a CCD image sensor. When a paper currency passes through a pathway of the device, the above-mentioned image sensor collects paper currency images in high speed. An analog to digital (AD) converter converts the paper currency images into image data, and a digital signal processor processes the image data quickly, to determine the position of the paper currency number, and the paper currency number is recognized by applying a recognition algorithm.

Since the number is usually printed on only one side of the paper currency and the direction in which the paper currency passing through the paper currency processing device is in random, generally the paper currency number is acquired by a way of transmission imaging, it's only needed to install one CIS on a paper currency transport pathway. A group of white light LED light sources is installed in front of the CIS, and a passing paper currency is set to be irradiated in a certain irradiation time Photographic imaging is formed by the lights that pass through the paper currency and fall on CIS. No matter the paper currency appears at a positive side or an opposite side of CIS, the paper currency number can be acquired.

However, a layer of dust is accumulated more or less on the surface of most of paper currencies which have been circulated for a period of time at the market, and therefore the energy of the light transmitted to an image sensor in CIS becomes weaker, which results in image blurring and illegible, and a recognition rate of the algorithm is reduced seriously. In the case that the turn-on time of the white light LED is lengthened alone, the energy of the light is strengthened, the old paper currency image becomes clearer and can be recognized, but the outline of the new paper currency image disappears due to the well transmission effect of the new paper currency. Therefore the recognition algorithm can not determine the position of the new paper currency number and thus causes recognition errors. By way of the conventional transmission imaging, it is impossible to form clear images for both the new paper currency and the old paper currency, and a problem for the recognition algorithm is caused, and paper currency number recognition is error prone.

SUMMARY

To overcome the disadvantage that it is impossible to form clear images for both the new paper currency and the old paper currency by way of the conventional transmission imaging, the disclosure provides a new method and device for recognizing paper currency number, which not only can recognize a half-new or brand-new paper currency number correctly, but also can recognize an old paper currency number correctly depending on degree of new or old of the paper currency.

A paper currency number recognition device is provided according to the disclosure, which includes: a contact sensor configured to acquire paper currency image data by way of transmission imaging; a white light LED transmission light source board arranged right in front of the contact sensor to provide the contact sensor with a transmission light source for use in collecting the paper currency image data; an image collection processing plate connected to the contact sensor through a data cable, where a Field Programmable Gate Array and a digital signal processor are integrated on the image collection processing plate, the Field Programmable Gate Array is configured to control the white light LED transmission light source board to be on or off and drive a CIS to acquire images, and the digital signal processor is configured to process and recognize the paper currency image data; and two pairs of position sensors arranged on a paper currency transport pathway at a position with a predetermined distance from the contact sensor and configured to detect whether there is a paper currency entering the paper currency number recognition device; where the white light LED transmission light source board has a strong light mode and a weak light mode, and the two light modes alternately provides the contact sensor with the transmission light source for use in collecting the paper currency image data.

Preferably, the two light modes may be formed by controlling turn-on time of the white light LED transmission light source board by the Field Programmable Gate Array, the strong light mode may be formed in a case that the turn-on time is longer, the weak light mode may be formed in a case that the turn-on time is shorter, and the ratio between the turn-on time for forming the strong light mode and the turn-on time for forming the weak light mode may be 3:1.

Preferably, a memory may be further integrated on the image collection processing plate, the memory may include two buffers and a register, the buffers may be configured to store the paper currency image data collected by the contact sensor, and the register may be configured to indicate a type of the paper currency image data in the buffers, with 1 indicating strong light image data and 0 indicating weak light image data.

Preferably, a clock MCLK with a cycle of 0.125 ms and a row counter may be provided inside the Field Programmable Gate Array (FPGA).

A paper currency number recognition method is further provided according to the disclosure, which includes: step 1, acquiring strong light image data and weak light image data of a paper currency by way of transmission imaging in the case that a transmission light source irradiates alternately in a strong light mode and in a weak light mode; step 2, performing an edge detection on the weak light image data to acquire four edges of an image to determine a target image; step 3, processing the target image to recognize a version, a nominal value, an orientation of the paper currency and determine an area where the paper currency number is located; step 4, calling a pattern recognition algorithm, comparing a gray value of the paper currency image with a threshold value by using a pattern recognition method based on artificial neural networks, to recognize that the paper currency is new or old, and using the strong light image data for recognition in the case of an old paper currency, or selecting the weak light image data for recognition in the case of a new paper currency; and step 5, outputting a number recognition result.

Preferably, four vertex coordinates of the paper currency image may be acquired, slopes of lines at which borders of the paper currency is located may be computed by using a least square line fitting method, and four edges of the image may be acquired, in step 2.

Preferably, acquiring strong light image data and weak light image data of a paper currency in step 1 may include: step 101, detecting a state of a position sensor; step 102, judging whether the position sensor is triggered, proceeding to step 103 in the case that the position sensor is triggered, or else returning to step 101 in the case that the position sensor is not triggered; step 103, starting to scan to acquire the paper currency image data, resetting a row counter, and proceeding to step 104; step 104, detecting a rising edge of a MCLK; step 105, judging whether the rising edge of the MCLK is detected, proceeding to step 106 in the case that the rising edge of the MCLK is detected, or returning to step 104 in the case that the rising edge of MCLK is not detected; step 106, switching a LED for strong light irradiation; step 107, driving, by a FPGA, a CIS to collect a row of image data, and proceeding to step 108 and step 120 simultaneously, where step 108 and subsequent steps of step 108 are performed in parallel with step 120 and subsequent steps of step 120; step 108, detecting the rising edge of the MCLK again; step 109, judging whether the rising edge of the MCLK is detected, proceeding to step 110 in the case that the rising edge of MCLK is detected, or returning to step 108 in the case that the rising edge of the MCLK is not detected; step 110, switching the LED for weak light irradiation; step 111, driving, by the FPGA, the CIS to collect a row of image data again, and proceeding to step 112 and step 120 simultaneously, where step 112 and subsequent steps of step 112 are performed in parallel with step 120 and subsequent steps of step 120; step 112, add 2 to the row counter in the FPGA; step 113, judging whether the count of the row counter in FPGA is equal to 960, proceeding to step 114 in the case that the count of the row counter in FPGA is equal to 960, or returning to step 104 in the case that the count of the row counter in FPGA is not equal to 960; step 114, completing image collection and ending scan; step 120, a DSP entering an interrupt service routine; step 121, detecting an image type register; step 122, judging whether the image data is strong light image data, proceeding to step 123 in the case that the image data is strong light image data, or proceeding to step 124 in the case that the image data is not strong light image data; step 123, storing the row of data into a strong light image buffer; and step 124, storing the row of data into a weak light image buffer.

The paper currency number recognition device and method according to the disclosure may acquire two white light transmission images with different brightness of the same paper currency at a time, may recognize the paper currency of new or old, and may select effectively an image with clear paper currency number for recognition. Therefore the numbers on new and old paper currencies may be recognized effectively and the accuracy for paper currency number recognition is improved, the process is clear and the construction is simple.

DETAILED DESCRIPTION

Hereinafter, the technical solutions in embodiments of the disclosure are described clearly and completely in conjunction with the drawings.

Figure 1:
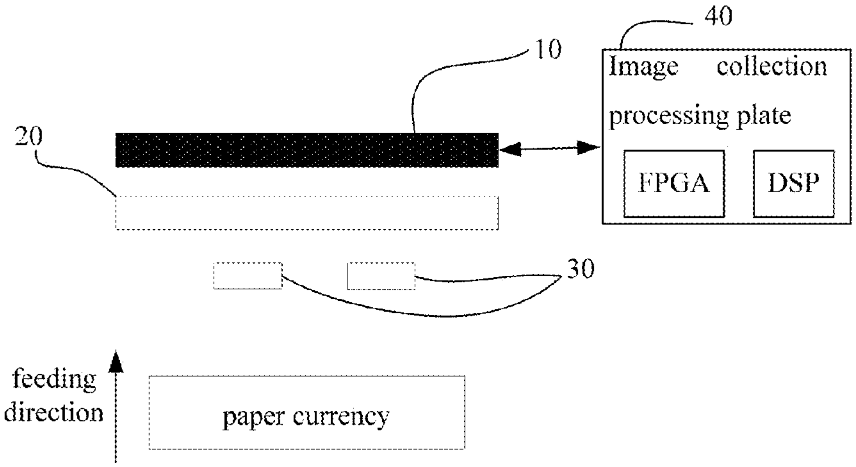
FIG. 1 is a schematic diagram of a hardware configuration of a paper currency number recognition device according to a preferable embodiment of the disclosure.

The paper currency number recognition device according to a preferable embodiment of the disclosure, as shown in FIG. 1, includes: a contact sensor 10 configured to acquire paper currency image data by way of transmission imaging; a white light LED transmission light source board 20 arranged right in front of the contact sensor to provide the contact sensor with a transmission light source for use in collecting the paper currency image data; an image collection processing plate 40 connected to the contact sensor 10 through a data cable, where a Field Programmable Gate Array (FPGA) and a digital signal processor (DSP) are integrated on the image collection processing plate 10, the Field Programmable Gate Array is configured to control the white light LED transmission light source board to be on or off and drive a CIS to acquire images, and the digital signal processor is configured to process and recognize the paper currency image data; and two pairs of position sensors 30 arranged on a paper currency transport pathway at a position with a predetermined distance from the contact sensor and configured to detect whether there is a paper currency entering the paper currency number recognition device, where the predetermined distance is 3 centimeter in this embodiment; where the white light LED transmission light source board has a strong light mode and a weak light mode, and the two light modes alternately provides the contact sensor with the transmission light source for use in collecting the paper currency image data. Furthermore, a memory is further integrated on the image collection processing plate, the memory includes two buffers and a register, the buffers are configured to store the paper currency image data collected by the contact sensor, and the register is configured to indicate a type of the paper currency image data in the buffers, with 1 indicating strong light image data and 0 indicating weak light image data.

In the case that a paper currency enters the transport pathway and triggers the position sensors 30, FPGA drives CIS to collect image data by way of a line by line scan. In order to make the image clear, the transverse resolution of CIS is set to 200 dpi and the longitudinal resolution of CIS is set to 100 dpi. It's provided that the paper currency passes through the pathway at a constant speed of 1 m/s. For obtaining two images with the longitudinal resolution of 100 dpi, FPGA needs to complete collection of a row of image data as the paper currency proceeds approximately each 0.125 mm. Therefore, a clock MCLK with a cycle of 0.125 ms is provided inside FPGA. Once a rising edge of the clock is detected, it indicates that the paper currency proceeds 0.125 mm, and then the scan process is started and a row of image data is scanned.

In order to obtain two images with different brightness, LED generates two different lights of strong and weak. The turn-on time of LED is set to two different values and the ratio between which is one to three (two factors correspond to the processing of the new paper currency and the processing of the old paper currency respectively). In a practical testing, the two factors correspond to 30 μs and 90 μs respectively, both of which are less than the time for the paper currency proceeding 0.125 mm, and LED is in the off state in the rest of the time for the paper currency proceeding 0.125 mm. During the proceeding of the paper currency, FPGA switches the turn-on time of LED once and lights LED upon detection of the rising edge of MCLK each time. In the LED irradiation period of time, CIS is sensitized, and then LED lights out when the period of time reaches an upper limit of the turn-on time. For one paper currency, if it's irradiated by the LED with strong lights, the lights induced by CIS become stronger, and the amplitude of a signal output is larger, a row of strong light image data is formed by converting the signal output by the analog to digital AD converter; or if it's irradiated by the LED with weak lights, the lights induced by CIS become weaker, and the amplitude of the signal output is smaller, a row of weak light image data is formed by converting the output by the analog to digital AD converter. FPGA acquires the row of data into the image buffer therein within 0.125 ms.

When FPGA acquires data, in addition to the image buffer, a register is also provided and is configured to indicate a type of the image data in the image buffers, with 1 indicating strong light image data and 0 indicating weak light image data. Two buffers are provided inside DSP to store the two types of the image data respectively. After FPGA completes collection of a row of image data, FPGA informs DSP in a manner of an interruption of acquiring data. DSP enters an interrupt service routine and detects an image type register in FPGA to determine the image type this time, and then the enhanced direct memory access (EDMA) transmission is started, the data is stored in order into a space for the respective image type. FPGA scans 120 mm (corresponding to collect 960 rows of data) and ends scan. In the case that all of the image data is transmitted, each of the two buffers in DSP may obtain one image, one image is bright and the other image is dim, each has 480 rows.

DSP recognizes the two images of one bright and the other dim as a whole, performs recognition on the bright image in the case where it is determined that the images belongs to an old paper currency, or performs recognition on the dim image in the case where it is determined that the images does not belong to an old paper currency, and thus the paper currency number of the paper currencies of the new and old is recognized.

Figure 2:
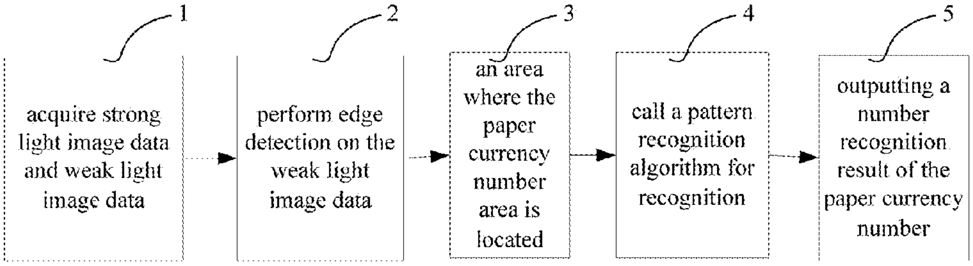
FIG. 2 is a flowchart of a paper currency number recognition method according to a preferable embodiment of the disclosure.

Specifically, as shown in FIG. 2, the paper currency number recognition method includes step 1 to step 5. In step 1, strong light image data and weak light image data of a paper currency are acquired by way of transmission imaging in the case that a transmission light source irradiates alternately in a strong light mode and in a weak light mode. In step 2, an edge detection on the weak light image data is performed to acquire four edges of the image to determine a target image. In step 3, the target image is processed to recognize a version, a nominal value, an orientation of the paper currency and determine an area where the paper currency number is located; step 4, a pattern recognition algorithm is called, a gray value of the paper currency image is compared with a threshold value by using a pattern recognition method based on an artificial neural network, to recognize that the paper currency is new or old, and the strong light image data is used for recognition in the case that it's recognized the paper currency of old, or the weak light image data is used for recognition in the case that it's recognized the paper currency of new. In step 5, a recognition result of the paper currency number is output.

Since the edge of the weak light image differs greatly from the background in pixel values, edge detection may be performed on both the new and old paper currencies by using the weak light image. Hence, the weak light image data is used to perform edge detection to obtain the target image in step 2.

In step 3, since the position of the paper currency number on the paper currency is fixed, the area of the paper currency number may be determined depending on the version, the nominal value, the orientation of the paper currency.

Preferably, four vertex coordinates of the paper currency image are acquired firstly, slopes of lines at which borders of the paper currency are located are computed by using a least square line fitting method, and four edges of the image are acquired, in step 2.

Figure 3:
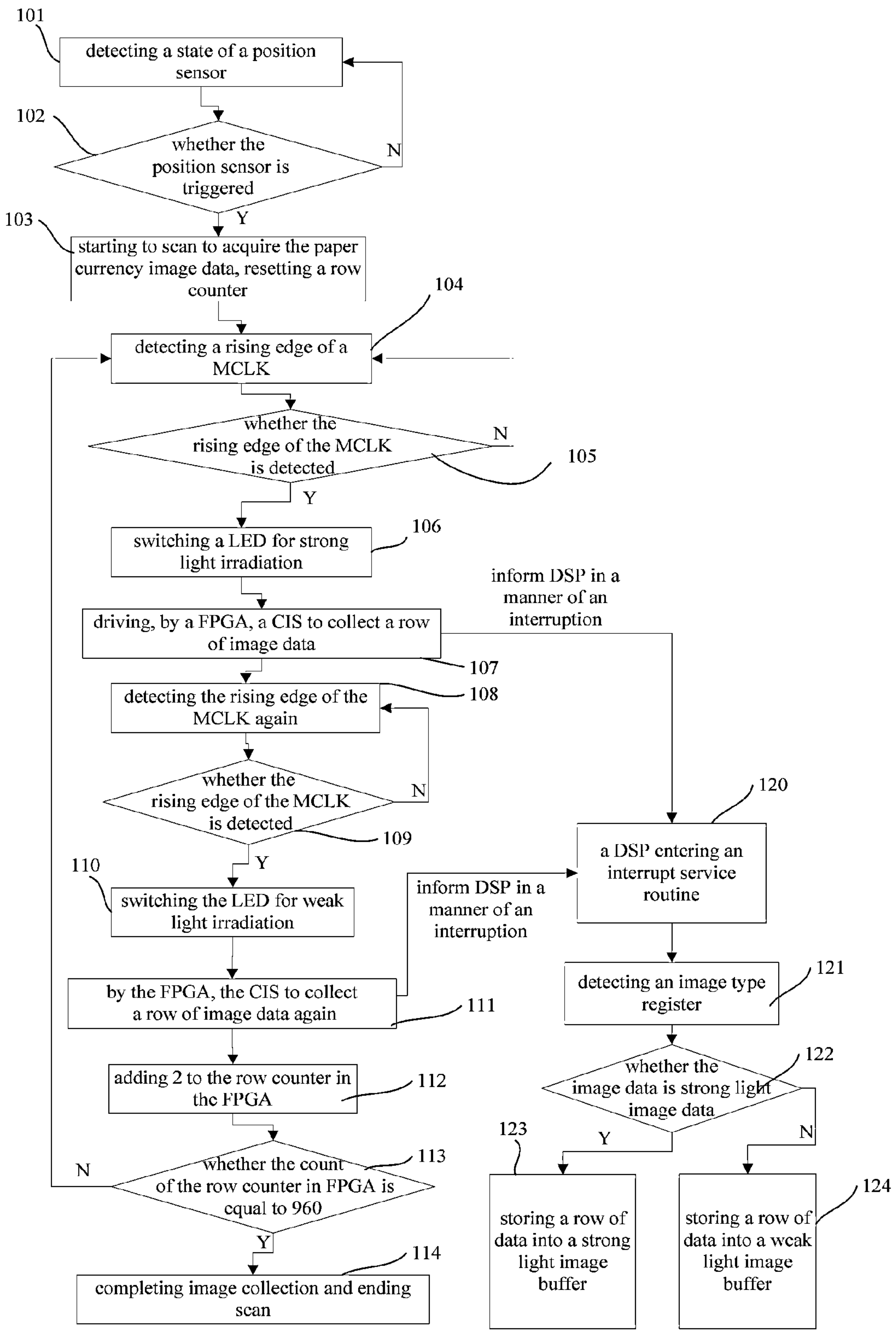
FIG. 3 is a decomposition flowchart of step 1 shown in FIG. 2.

As shown in FIG. 3, the strong light image data and weak light image data of a paper currency being acquired in step 1 may include step 101 to step 124. In step 101, a state of a position sensor is detected. In step 102, it's judged whether the position sensor is triggered, step 103 is proceeded to in the case that the position sensor is triggered, or step 101 is returned to in the case that the position sensor is not triggered. In step 103, it's started to scan to acquire the paper currency image data, a row counter is reset, and step 104 is proceeded to. In step 104, a rising edge of MCLK is detected. In step 105, it's determined whether the rising edge of MCLK is detected, step 106 is proceeded to in the case that the rising edge of MCLK is detected, or step 104 is returned to in the case that the rising edge of MCLK is not detected. In step 106, the LED is switched for strong light irradiation. In step 107, CIS is driven by the FPGA to collect a row of image data, and step 108 and step 120 are simultaneously proceeded to, where step 108 and its subsequent steps are performed in parallel with step 120 and its subsequent steps. In step 108, the rising edge of MCLK is detected again. In step 109, it's judged whether the rising edge of MCLK is detected, step 110 is proceeded to in the case that the rising edge of MCLK is detected, or step 108 is returned to in the case that the rising edge of MCLK is not detected. In step 110, the LED is switched for weak light irradiation. In step 111, CIS is driven by FPGA to collect a row of image data again, and step 112 and step 120 are simultaneously proceeded to, where step 112 and its subsequent steps are performed in parallel with step 120 and its subsequent steps. In step 112, 2 is added to the row counter in FPGA. In step 113, it's judged whether the count of the row counter in FPGA is equal to 960, step 114 is proceeded to in the case that the count of the row counter in FPGA is equal to 960, or step 104 is returned to in the case that the count of the row counter in FPGA is not equal to 960. In step 114, the image collection is completed and the scan is ended. In step 120, DSP enters an interrupt service routine. In step 121, an image type register is detected. In step 122, it's judged whether the image data is strong light image data, step 123 is proceeded to in the case that the image data is strong light image data, or step 124 is proceeded to in the case that the image data is not strong light image data. In step 123, the row of data is stored into a buffer for a strong light image. In step 124, the row of data is stored into a buffer for a weak light image.

Step 120 to step 124 is the a storing process for a image, that is to say, image data of a row of a image is stored once the row of the image is scanned, and the storing process is performed according to the type of the image data. The storing process may be proceeded in parallel with the image scan process. For example, after step 107, step 108 and step 120 are simultaneously proceeded to. Alternatively, firstly the image data may be stored once a row of image is scanned, and then a next row of image is scanned, that is to say, after step 107, step 120 is proceeded to, and the step 121, step 122 are performed in turn, until step 123 or step 124 is performed, and then step 108 is performed. In this case, the processing speed is reduced, and the setting of the cycle of the clock MCLK inside the Field Programmable Gate Array may be influenced, and the setting of the turn-on time of the white light LED transmission light source may also be influenced, the cycle and the turn-on time both may need to be adjusted. Therefore, preferably, the image scan and the reading and storing of each row of the image data proceed in parallel.

In the case of scanning in single mode, only one weak light image data is collected, and the paper currency with worn degree or defaced degree of less than 50% meets the condition for algorithm recognition. For the old paper currency, the light transmittance is reduced due to the dirt, oil existing on the surface, and thus the gray value of the image is too low. Although the edge of the image may be acquired correctly, the contrast ratio of the image is too low. the nominal value and the orientation of the paper currency can not be recognized by applying the algorithm effectively, and then the position of the paper currency number on the paper currency can not be determined. Also, with low contrast ratio, it is difficult to distinguish the paper currency, and the accuracy for the recognition of the paper currency number is greatly decreased and the recognition effect is influenced seriously. In the case that the light is strengthened, only one strong light image data is collected, the old paper currency meets the condition for the algorithm of the recognition. But the new paper currency can not meet the condition for the algorithm of the recognition, because the high light transmittance causes the image is prone to be overexposed for the new paper currency and the edge of the image is missed. Therefore the length and width of the paper currency can not be determined by applying the algorithm effectively. An individual digit in the paper currency number may also be missed and thus an error occurs in the recognition.

Dual modes are used in the embodiment, the algorithm is performed in the recognition on the bright image of the old paper currency images and is performed in the recognition on the dim image of the new paper currency images, in which the paper currency number image is clearer and suitable for the algorithm to determine the position of the paper currency number and recognize the paper currency correctly.

What is described above is only the detailed description of the disclosure, but the scope of protection of the disclosure is not limited thereto. Any changes and substitutions realized easily by any one of those skilled in the art within the scope of technologies disclosed in the disclosure are all contained in the scope of protection of the disclosure. Hence, the scope of protection of the disclosure subjects to the scope of protection of the claims.

What is claimed is:

1. A paper currency number recognition device, comprising:

a contact sensor configured to acquire paper currency image data by way of transmission imaging;

a white light LED transmission light source board arranged right in front of the contact sensor to provide the contact sensor with a transmission light source for use in collecting the paper currency image data;

an image collection processing plate connected to the contact sensor through a data cable, wherein a Field Programmable Gate Array and a digital signal processor are integrated on the image collection processing plate, the Field Programmable Gate Array is configured to control the white light LED transmission light source board to be on or off and drive a CIS to acquire images, and the digital signal processor is configured to process and recognize the paper currency image data; and two pairs of position sensors arranged on a paper currency transport pathway at a position with a predetermined distance from the contact sensor and configured to detect whether there is a paper currency entering the paper currency number recognition device;

wherein the white light LED transmission light source board has a strong light mode and a weak light mode, and the two light modes alternately provides the contact sensor with the transmission light source for use in collecting the paper currency image data, and wherein, after the Field Programmable Gate Array completes collection of a row of image data, the Field Programmable Gate Array informs the digital signal processor in a manner of an interruption of acquiring data, and the digital signal processor enters an interrupt service routine and detects an image type register to determine a type of the row of image data.

2. The paper currency number recognition device according to claim 1, wherein the two light modes are formed by controlling turn-on time of the white light LED transmission light source board by the Field Programmable Gate Array, the strong light mode is formed in a case that the turn-on time is longer, the weak light mode is formed in a case that the turn-on time is shorter, and the ratio between the turn-on time for forming the strong light mode and the turn-on time for forming the weak light mode is 3:1.

3. The paper currency number recognition device according to claim 1, wherein a memory is integrated on the image collection processing plate, the memory comprises two buffers and the register, the buffers are configured to store the paper currency image data collected by the contact sensor, and the register is configured to indicate a type of the paper currency image data in the buffers, with 1 indicating strong light image data and 0 indicating weak light image data.

4. The paper currency number recognition device according to claim 1, wherein a clock MCLK with a cycle of 0.125 ms and a row counter are provided inside the Field Programmable Gate Array.

5. A paper currency number recognition method, comprising:

step 1 comprising acquiring strong light image data and weak light image data of a paper currency by way of transmission imaging in the case that a transmission light source irradiates alternately in a strong light mode and in a weak light mode;

step 2 comprising performing an edge detection on the weak light image data to acquire four edges of an image to determine a target image;

step 3 comprising processing the target image to recognize a version, a nominal value, an orientation of the paper currency and determine an area where the paper currency number is located;

step 4 comprising calling a pattern recognition algorithm, comparing a gray value of the paper currency image with a threshold value by using a pattern recognition method based on artificial neural networks to recognize that the paper currency is new or old, and using the strong light image data for recognition in the case of an old paper currency, or selecting the weak light image data for recognition in the case of a new paper currency; and step 5 comprising outputting a recognition result of the paper currency number, wherein, after the Field Programmable Gate Array completes collection of a row of image data, the Field Programmable Gate Array informs the digital signal processor in a manner of an interruption of acquiring data, and the digital signal processor enters an interrupt service routine and detects an image type register to determine a type of the row of image data.

6. The paper currency number recognition method according to claim 5, wherein four vertex coordinates of the paper currency image are acquired, slope-a slopes of lines at which borders of the paper currency is located is computed by using a least square line fitting method, and four edges of the image are acquired, in step 2.

7. The paper currency number recognition method according to claim 5, wherein acquiring strong light image data and weak light image data of a paper currency in step 1 comprises:

step 101 comprising detecting a state of a position sensor;

step 102 comprising judging whether the position sensor is triggered, proceeding to step 103 in the case that the position sensor is triggered, or returning to step 101 in the case that the position sensor is not triggered;

step 103 comprising starting to scan to acquire the paper currency image data, resetting a row counter, and proceeding to step 104;

step 104 comprising detecting a rising edge of a MCLK;

step 105 comprising judging whether the rising edge of the MCLK is detected, proceeding to step 106 in the case that the rising edge of MCLK is detected, or returning to step 104 in the case that the rising edge of MCLK is not detected;

step 106 comprising switching a LED for strong light irradiation;

step 107 comprising driving, by a FPGA, a CIS to collect a row of image data, and proceeding simultaneously to step 108 and step 120, wherein step 108 and subsequent steps of step 108 are performed in parallel with step 120 and subsequent steps of step 120;

step 108 comprising detecting the rising edge of the MCLK again;

step 109 comprising judging whether the rising edge of the MCLK is detected, proceeding to step 110 in the case that the rising edge of the MCLK is detected, or returning to step 108 in the case that the rising edge of the MCLK is not detected;

step 110 comprising switching the LED for weak light irradiation;

step 111 comprising driving, by the FPGA, the CIS to collect a row of image data again, and proceeding simultaneously to step 112 and step 120, wherein step 112 and subsequent steps of step 112 are performed in parallel with step 120 and subsequent steps of step 112;

step 112 comprising adding 2 to the row counter in the FPGA;

step 113 comprising judging whether the count of the row counter in FPGA is equal to 960, proceeding to step 114 in the case that the count of the row counter in FPGA is equal to 960, or returning to step 104 in the case that the count of the row counter in FPGA is not equal to 960;

step 114 comprising completing image collection and ending scan;

step 120 comprising a DSP entering an interrupt service routine;

step 121 comprising detecting the image type register;

step 122 comprising judging whether the image data is strong light image data, proceeding to step 123 in the case that the image data is strong light image data, or proceeding to step 124 in the case that the image data is not strong light image data;

step 123 comprising storing a row of data into a strong light image buffer; and step 124 comprising storing a row of data into a weak light image buffer.

* * * * *